United States Patent
Brodsky et al.

(10) Patent No.: US 10,502,619 B2
(45) Date of Patent: *Dec. 10, 2019

(54) CHARACTERIZATION OF SINGLE-PHOTON DETECTORS USING A CONTINUOUS WAVE LASER SOURCE

(71) Applicant: AT&T Intellectual Property I, L.P., Atlanta, GA (US)

(72) Inventors: Michael Brodsky, Millburn, NJ (US); Cristian Antonelli, Sulmona (IT); Jungmi Oh, Daejeon (KR)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,682

(22) Filed: Aug. 29, 2017

(65) Prior Publication Data

US 2017/0356797 A1  Dec. 14, 2017

Related U.S. Application Data

(60) Division of application No. 14/719,975, filed on May 22, 2015, now Pat. No. 9,772,223, which is a (Continued)

(51) Int. Cl.
  *G01J 1/44*  (2006.01)
  *G01J 1/08*  (2006.01)
  *G01J 1/42*  (2006.01)

(52) U.S. Cl.
  CPC . *G01J 1/44* (2013.01); *G01J 1/08* (2013.01); *G01J 1/42* (2013.01); *G01J 2001/442* (2013.01); *G01J 2001/4466* (2013.01)

(58) Field of Classification Search
  None
  See application file for complete search history.

(56) References Cited

U.S. PATENT DOCUMENTS 8,285,515 B2  10/2012  Brodsky
8,611,535 B2  12/2013  Brodsky
(Continued)

OTHER PUBLICATIONS

By Valentina Schettini, Implementing a Multiplexed System of Detectors for Higher Photon Counting Rates, IEEE Journal of Selected Topics in Quantum Electronics, vol. 13, No. 4, Jul./Aug. 2007, p. 978-983.*

(Continued)

*Primary Examiner* — Tung S Lau
(74) *Attorney, Agent, or Firm* — Chiesa Shahinian & Giantomasi PC

(57) ABSTRACT

Operational parameters of a single-photon detector are determined with a continuous wave laser source. At a fixed trigger, a dark count probability and a series of count probabilities at different optical powers are determined. A particular optical power is selected by using a wide-range variable attenuator to attenuate the optical power of the continuous wave laser. The dark count probability and the count probabilities are determined for different trigger rates. The operational parameters include efficiency, afterpulsing constant, and detrap time. The operational parameters are computed by fitting the computed dark count probabilities and count probabilities to a user-defined relationship.

9 Claims, 9 Drawing Sheets

Related U.S. Application Data continuation of application No. 12/834,956, filed on Jul. 13, 2010, now Pat. No. 9,068,881.

(56) References Cited

U.S. PATENT DOCUMENTS

| | | | |
|---|---|---|---|
| 9,068,881 B2 | 6/2015 | Brodsky | |
| 2001/0055389 A1* | 12/2001 | Hughes | H04B 10/70 380/44 |
| 2012/0016634 A1* | 1/2012 | Brodsky | G01J 1/08 702/181 |
| 2012/0063596 A1* | 3/2012 | Brodsky | H04B 10/70 380/256 |
| 2012/0063769 A1* | 3/2012 | Brodsky | H04B 10/70 398/25 |

OTHER PUBLICATIONS

Thomas Frach, The Digital Silicon Photomultiplier—Principle of Operation and Intrinsic Detector Performance, 7 pages, 2009.*

Jungmi Oh, method for characterizing single photon detectors in saturation regime by cw laser, ATT labs, 2009 optical society of America, 6 pages.*

Johannes Kroger (Beyond conventional photon-number detection with click detectors, Jun. 2017, 11 pages (Year: 2017).*

Princeton Lightwave Single Photon Benchtop Receiver PGA-600, www.princetonlightwave.com, Issue 1.02, Sep. 2011, 3 pgs.

Niclass et al., "A 128×128 Single-Photon Image Sensor with Column Level 10-Bit Time-to-Digital Converter Array," IEEE Journal of Solid-State Circuits, vol. 43, No. 12, Dec. 2008, pp. 2977-2989.

Levine et al., "Near Room Temperature 1.3 um Single Photon Counting with a inGaAs Avalanche Photodiode," Electronics Letters, vol. 20, Issue 14, Jul. 5, 1984, pp. 596-598.

Stucki et al., "Photon Counting for Quantum Key Distribution with Peltier Cooled inGaAs/InP APD's," Journal of Modern Optics, vol. 48, Issue 13, Feb. 2001, pp. 1967-1981.

Wegmuller et al., "Photon Counting OTDR for Local Birefrindence and Fault Analysis in the Metro Environment," Journal of Lightwave Technology, vol. 22, No. 2, Feb. 2004, pp. 390-400.

Bethune et al., "A High Performance Integrated Single Photon Detector for Telecom Wavelengths," J. Mod. Opt. 51, pp. 1359-1368, 2004.

Yoshizawa et al., "Quantum Efficiency Evaluation Method for Gated-Mode Single Photon Detector," Electron. Lett. 38 (23), pp. 1468-1469, 2002.

Polyakov et al., "High Accuracy Verification of a Correlated-Photon-Based Method for Determining Photoncounting Detection Efficiency," Opt. Express 15(4), pp. 1390-1407, 2007.

Itzler et al, "Single Photon Avalanche Diodes (SPADs) for 1.5 um Photon Counting Applications," J. Mod. Opt. 54(2), pp. 283-304, 2007.

Jiang et al., "InGaAsP-InP Avalanche Photodiodes for Single Photon Detection," IEEE J. Sel. Top. Quantum Electron. 13(4), pp. 895-905, 2007.

Kang et al., "Dark Count Probability and Quantum Efficiency of Avalanche Photodiodes for Single-Photon Detection," Appl. Phys. Lett. 83(14) , p. 2955, 2003.

Zhang et al., "Comprehensive Characterization of InGaAs/InP Avalanche Photodiodes at 1550 nm with an Active Quenching ASIC," IEEE J. Quantum Electron. 45(7), pp. 792-799, 2009.

\* cited by examiner

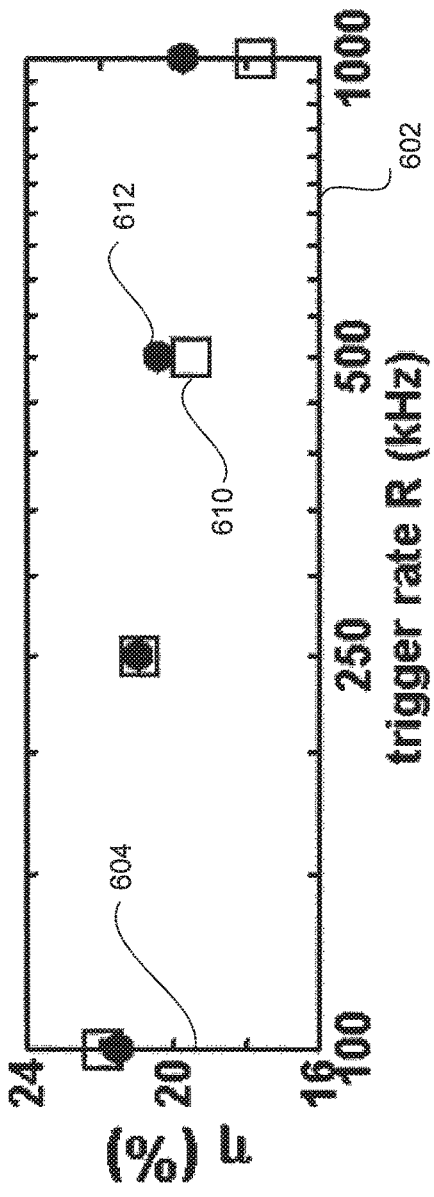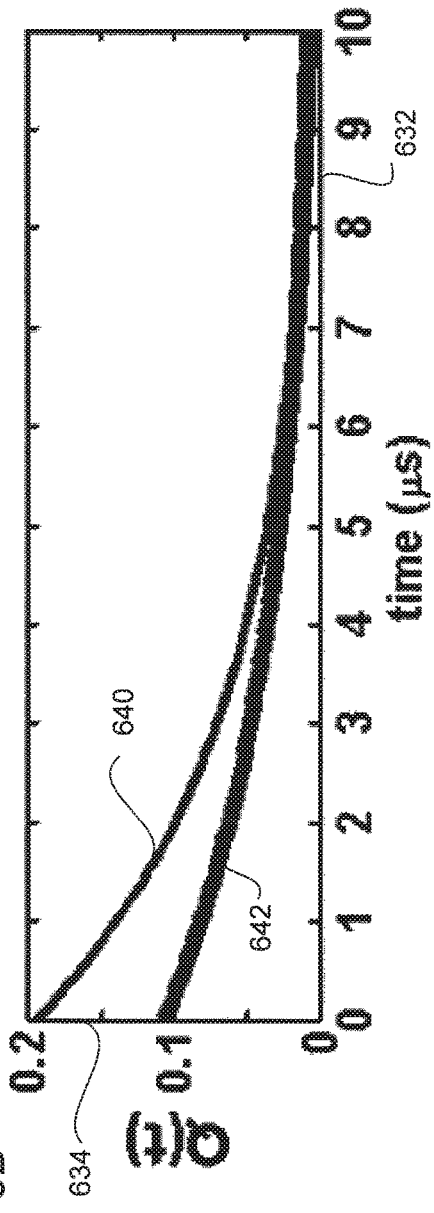

CHARACTERIZATION OF SINGLE-PHOTON DETECTORS USING A CONTINUOUS WAVE LASER SOURCE

This application is a divisional application of prior U.S. patent application Ser. No. 14/719,975 filed on May 22, 2015, which is a continuation of prior U.S. patent application Ser. No. 12/834,956, filed Jul. 13, 2010 and issued as U.S. Pat. No. 9,068,881 on Jun. 30, 2015, all of which are herein incorporated by reference in their entirety. This application is related to U.S. patent application Ser. No. 12/834,940, filed Jul. 13, 2010 and issued as U.S. Pat. No. 8,285,515 on Oct. 9, 2012, which is herein incorporated by reference in its entirety.

BACKGROUND

The present disclosure relates generally to optical detectors, and more particularly to characterization of single-photon detectors using a continuous wave laser source.

An optical detector that has a sufficiently high detection sensitivity that it can detect a single photon is referred to as a single-photon detector (SPD). Single-photon detectors operating over various ranges of wavelengths have been used for various applications, including ultrahigh resolution optical time domain reflectometry, photon-correlation spectroscopy, and device characterization. At present, there is particularly strong interest in the application of SPDs for optical telecommunications. One method for high-security transmission over an optical telecommunications network is quantum cryptography, which utilizes quantum key distribution via single photons. Fiberoptic transport networks typically operate over a wavelength range of ~1.3-1.6 µm. Over this wavelength range, single-photon detectors are typically based on avalanche photodiodes (APDs) fabricated from InP/InGaAs/InGaAsP heterostructures.

A critical performance parameter characterizing an SPD is its detector efficiency. For optical telecommunications, SPDs typically have a low detector efficiency (~10-30%); furthermore, the detector efficiency drifts with time. Current methods for measuring the detector efficiency of SPDs use complicated timing control schemes and ultralow input power levels. Current measurement equipment is typically bulky and expensive, including electronic time delays, pulsed lasers, high dynamic range attenuators, and high sensitivity power meters. What is needed is a simple, low-cost, compact system for measuring the detector efficiency, and other characteristics, of a single-photon detector.

BRIEF SUMMARY

Operational parameters of a single-photon detector are determined with a continuous wave laser source. For each trigger rate selected from a plurality of trigger rates, a dark count probability is computed from recorded dark counts, and a plurality of count probabilities are computed from recorded counts. Each particular count probability is determined from a particular optical power selected from a plurality of optical powers. The operational parameters include efficiency, afterpulsing constant, and detrap time. The operational parameters are computed by fitting the computed dark count probabilities and count probabilities to a user-defined relationship.

These and other advantages of the disclosure will be apparent to those of ordinary skill in the art by reference to the following detailed description and the accompanying drawings.

BRIEF DESCRIPTION OF THE DRAWINGS

FIG. 6A shows plots of detector efficiency for a continuous wave laser source as a function of function of the average number of photons per detector gate for different values of trigger rate;

FIG. 6B shows plots of afterpulse parameter as a function of time;

DETAILED DESCRIPTION

Figure 1:
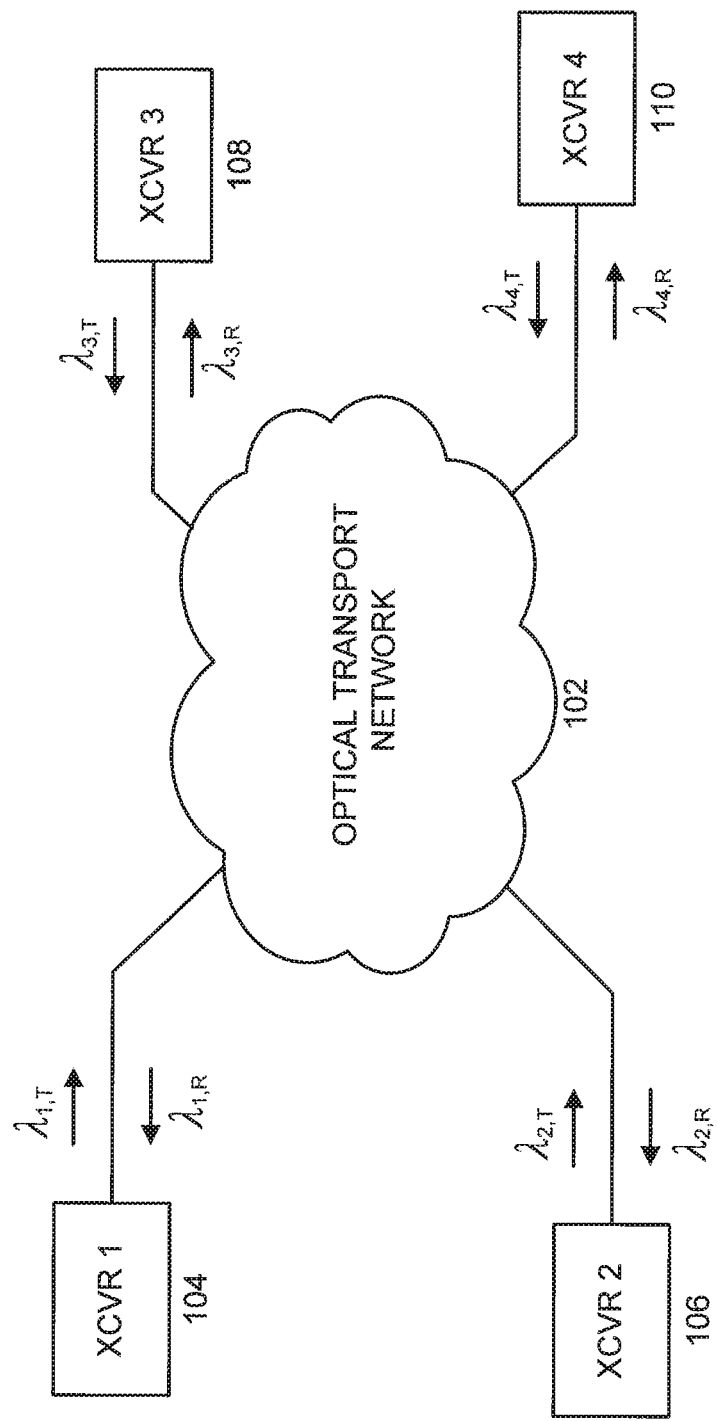
FIG. 1 shows a schematic of a generic optical telecommunications system.

FIG. 1 shows a schematic of a generic optical telecommunications system. Multiple optical transceivers (XCVRs) send and receive lightwave signals via optical transport network 102 (such as a fiberoptic network). Shown are four representative transceivers, referenced as XCVR 1 104, XCVR 2 106, XCVR 3 108, and XCVR 4 110, respectively. The receivers in the transceivers include single-photon detectors (SPDs). Each transceiver has a corresponding transmit wavelength ($\lambda_{n,T}$) and a corresponding receive wavelength ($\lambda_{n,R}$), where n=1-4.

Figure 2A:
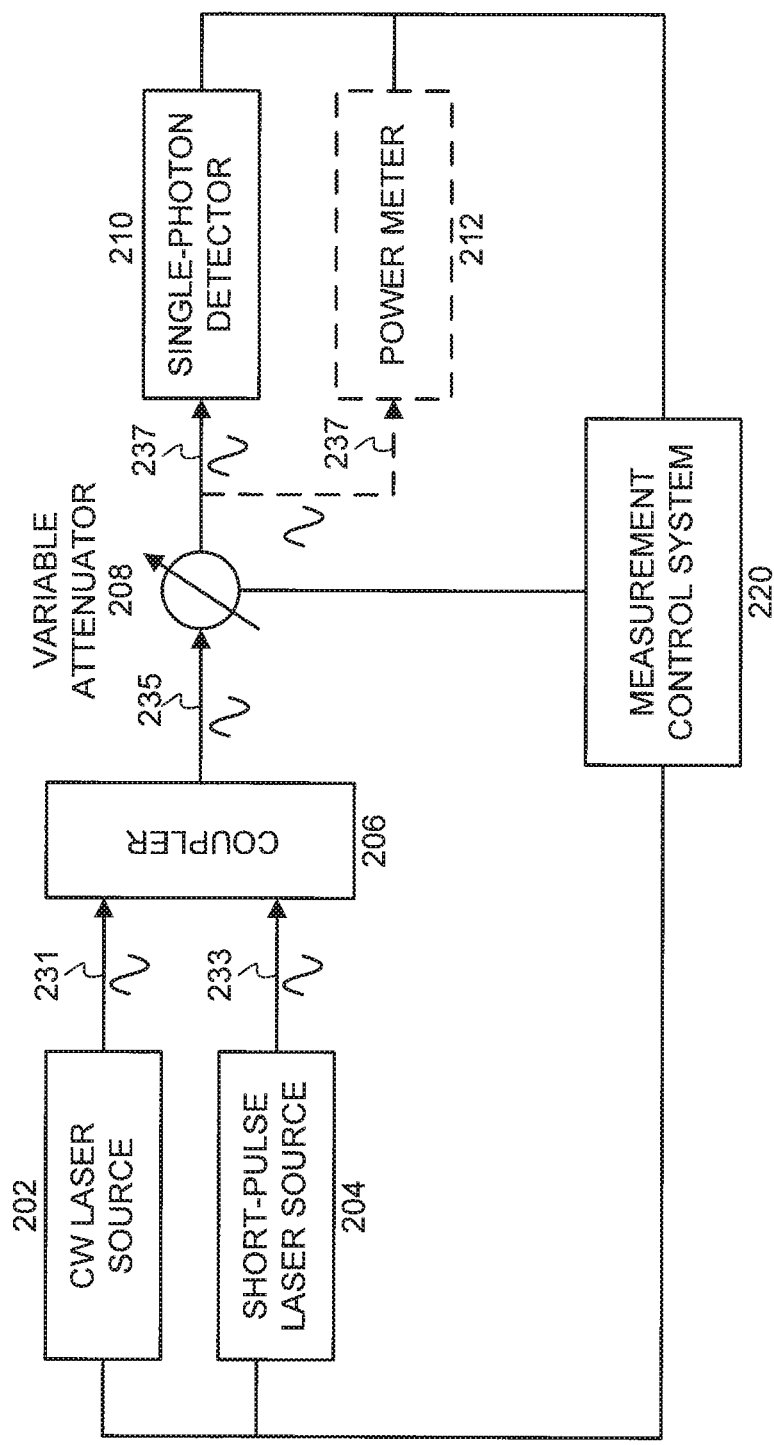
FIG. 2A shows a schematic of a measurement system, including a reference pulse laser source and a power meter, for measuring the operational parameters of a single-photon detector.

FIG. 2A shows a dual-mode measurement system for measuring the operational parameters of a single-photon detector. The measurement system can compare measurements using a short-pulse laser source with measurements using a continuous wave (CW) laser source. Continuous wave laser source 202 transmits optical beam 231, and short-pulse laser source 204 transmits optical beam 233. Optical beam 231 and optical beam 233 are transmitted to coupler 206 [for example, an equal-intensity (50:50) coupler]. The output of coupler 206 is optical beam 235, which is transmitted through variable attenuator 208. The output of variable attenuator 208 is transmitted as optical beam 237 to single-photon detector 210, or, alternatively, to power meter 212. The electronic charge pulses from the output of single-photon detector 210 are detected and counted by counter 214. The operations of CW laser source 202, short-pulse laser source 204, variable attenuator 208, single-photon detector 210, counter 214, and power meter 212 are controlled by measurement control system 220. Various elements of the measurement system can also be manually controlled by a user.

In the example shown in FIG. 2A, the transport medium is optical fiber, and the wavelength of all the optical beams (optical beam 231—optical beam 237) is $\lambda$=1.55 µm. As discussed above, SPDs for wavelengths used in optical telecommunications are typically based on an avalanche photodiode (APD). Operation of an APD is a function of the reverse bias voltage applied across the APD. When the bias voltage exceeds the breakdown voltage, an incident photon can initiate a carrier avalanche, resulting in a charge pulse that can be electronically detected. A carrier avalanche can also be initiated by a source other than an incident photon (such as a trapped charge or a phonon). These other sources can generate background counts, resulting in background noise.

Figure 3:
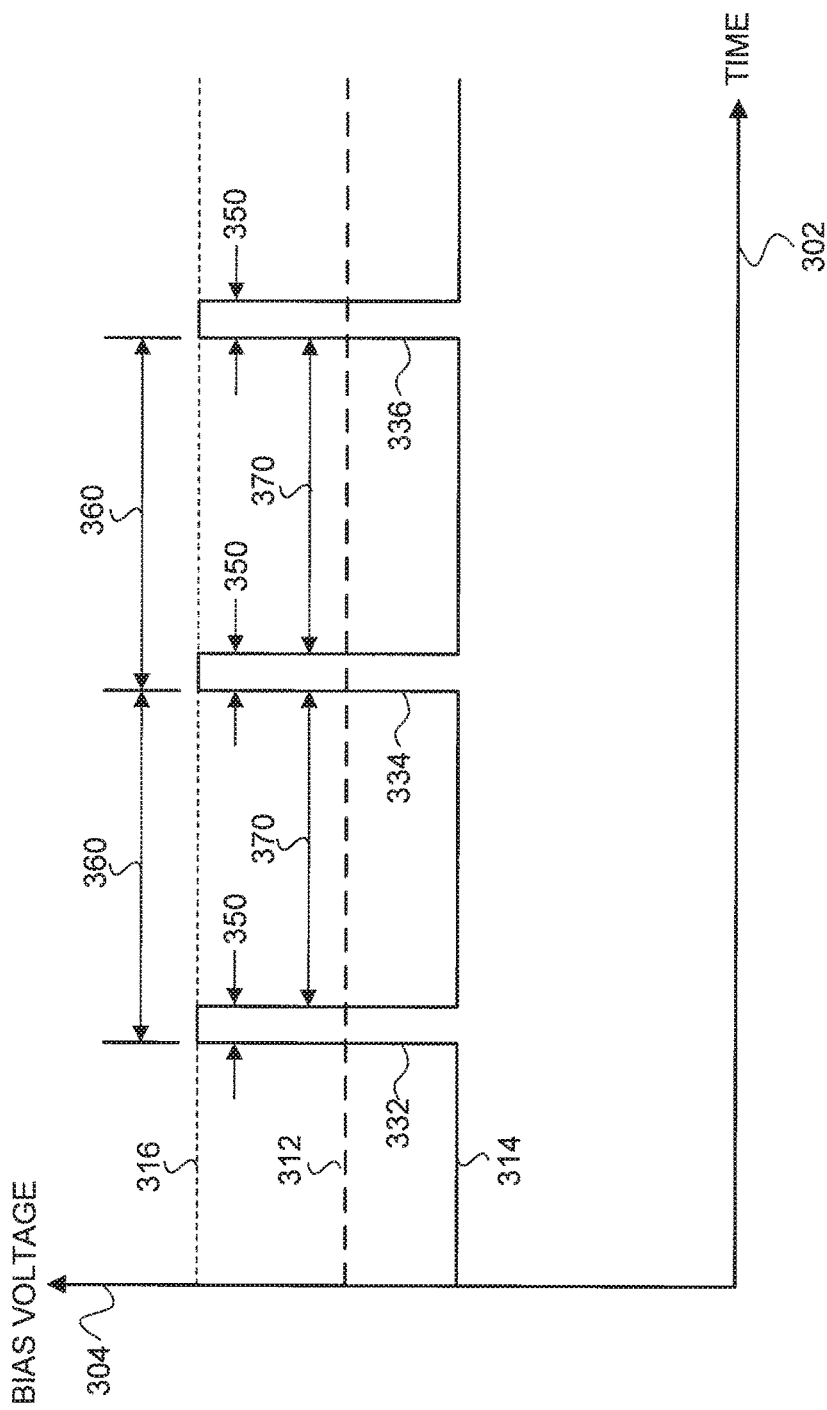
FIG. 3 shows bias pulses applied to a single-photon detector.

To reduce background noise, an APD can be operated in a gated mode, as shown in FIG. 3. The horizontal axis 302 represents time, and the vertical axis 304 represents bias voltage. Shown are three reference voltages: reference voltage 312 is the breakdown voltage; reference voltage 314, below the breakdown voltage, is the pulse baseline voltage; and reference voltage 316, above the breakdown voltage, is the pulse peak voltage. The bias voltage is modulated by a periodic sequence of pulses (shown as ideal rectangular pulses), referred to as bias pulses (also referred to as gate pulses). Shown are three representative bias pulses: bias pulse 332, bias pulse 334, and bias pulse 336. The amplitude of the bias pulses ranges from the pulse baseline voltage 314 to the pulse peak voltage 316. The pulse width (also referred to as the gate window) is referenced as pulse width 350. The period between pulses is referenced as period 360. The inverse of the period between pulses is referred to as the trigger rate. The interval delimited by the end of one pulse and the start of another pulse is referenced as afterpulse interval 370.

During a bias pulse, the bias voltage is greater than the breakdown voltage, and an incident photon can initiate a carrier avalanche that results in a charge pulse that can be electronically detected. During an afterpulse interval, the bias voltage is less than the bias voltage. The charge state of the APD, however, does not relax instantaneously. During an afterpulse interval, an incident photon can still trigger a carrier avalanche, resulting in a detected signal. In addition, as discussed above, even in the absence of incident photons (dark conditions), other sources can trigger carrier avalanches, resulting in dark counts. Dark counts are dependent on the temperature of the SPD. If the incident photons are generated by a pulsed laser source that is synchronized with the bias pulses, the effects of non-photon induced carrier avalanches can be reduced. For characterization of commercial SPDs, a pulsed laser source at ultralow powers is typically used. A CW laser source at relatively higher powers would be desirable, however, since the measurement system would be simpler and more economical.

Return to FIG. 2A. Short-pulse laser source 204, used for reference measurements, emits optical pulses with an optical pulse width of ~30 ps; the short-pulse laser source 204 is synchronized with the single-photon detector 210. Variable attenuator 208 is a double-stage variable attenuator with a total range of 85 dB. Each stage is calibrated independently at relatively high input power levels of −50 dBm by using the power meter 212. The calibration enables precise control of the power at levels below the sensitivity of the power meter 212. By adjusting variable attenuator 208, the average number of photons per detector gate (average number of photons per measurement interval), $\mu$, is adjusted down to 0.02 for both the CW laser source 202 and the short-pulse laser source 204. For each detection event, single-photon detector 210 generates an electrical Nuclear Instrumentation Module Standard (NIM) pulse. The NIM pulses are integrated by electronic counter 214.

To determine the average number of photons per detector gate in the CW regime, the effective gate window of the detector $\tau_g$ is measured. During each counting cycle, a 1-ns-wide electrical bias pulse brings the APD above the breakdown voltage. Conventionally, the maximum efficiency $\eta_0$ achieved at the peak of the bias pulse is measured with a properly aligned narrow optical pulse and serves as the major specification for commercial SPDs. With a CW laser source, however, the efficiency changes during the duration of the bias pulse in a non-linear fashion. To simplify calculations, an SPD is modelled in the CW regime as operating at its maximum efficiency value $\eta_0$ for an effective gate window $\tau_g$. To determine $\tau_g$ experimentally, the probability of a count $P_c$ is measured over a wide power range for both CW and pulsed lasers at a fixed trigger rate R. In the discussion below, R=100 kHz; however, other trigger rates can be used as well. The values of the CW laser power $P_{cw}$ and the average pulsed laser power $P_p$ are then selected such that the corresponding count probabilities are equal: $P_c(P_{cw}) = P_c(P_p)$. The effective gate window is then calculated as $\tau_g = 10^{(P_p - P_{cw} - 10\ log_{10}(R))/10}$, where the power values are measured in dBm. When averaged over the entire power range, $\tau_g$ is observed to fall in a range of 0.49 ns-0.59 ns for various commercial SPDs.

Figure 4:
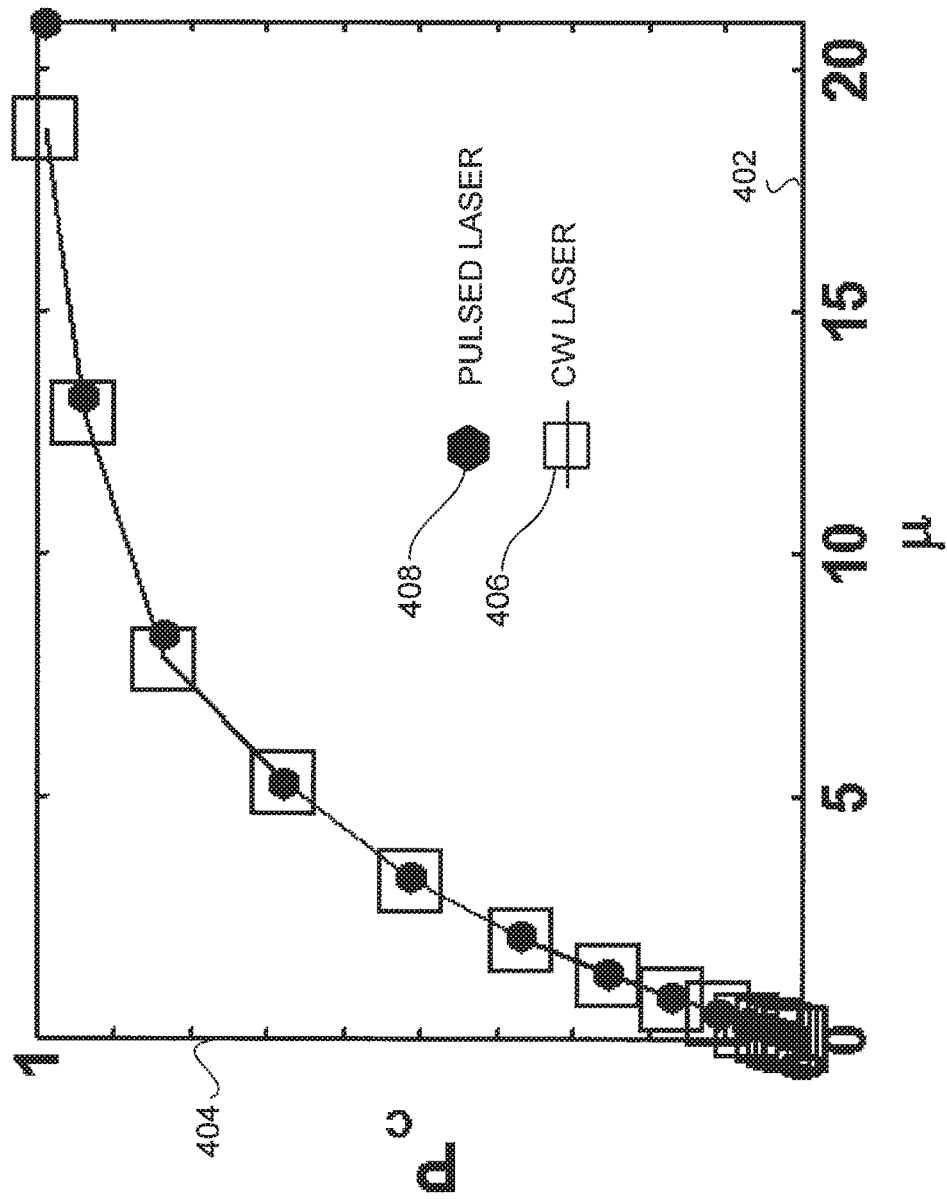
FIG. 4 shows plots of probability count as a function of the average number of photons per detector gate.

FIG. 4 shows plots of the measured count probability as a function of the average number of photons per detector gate. The horizontal axis 402 represents the average number of photons per detector gate, $\mu$. The vertical axis 404 represents the measured count probability, $P_c$. The open squares 406 show the results for CW laser source 202, and the filled dots 408 show the results for short-pulse laser source 204. More specifically, the plots show the measured count probabilities $P_c(\mu)$ as a function of the average number of photons per detector gate $\mu_{cw}$ for CW laser source 202 and as a function of the average number of photons per detector gate $\mu_p$ for short-pulse laser source 204, where $$\mu_{cw} = \frac{10^{(P_{cw}/10)}}{1000 \times h \times v} \times \tau_g \text{ and } \mu_p = \frac{10^{(P_p/10)}}{1000 \times h \times v \times R}.$$

Here h is Planck's constant and $v=1/\lambda$ is the optical frequency. When $\tau_g=0.49$ ns, the measured count probabilities in the CW and the pulsed case are equal.

The dependence shown in FIG. 4 saturates because avalanche SPDs are not sensitive to the number of registered photons (a registered photon is a photon that sets off an avalanche). For Poissonian photon statistics, this saturation was first described by B. F. Levine et al. ("Near room temperature 1.3 µm single photon counting with a InGaAs avalanche photodiode,"*Electron Lett.*, vol. 20, no. 14, pp. 596-598, July 1984) by the expression:

$$P_c = 1 - (1 - P_{dc}) \times \exp(-\mu\eta), \tag{E1}$$

where $P_{dc}$ is the probability of a dark count, $\mu$ is the average number of photons per detector gate, and $\eta$ is the detector efficiency. The measured data, however, deviates from the dependence in (E1) in two ways. First, the measured count probability is found to be somewhat higher at lower $\mu$ values; this result suggests the presence of afterpulses, as described by M. A. Itzler et al. ("Single photon avalanche diodes (SPADs) for 1.5 µm photon counting applications," *J. Mod. Opt.*, vol. 54, no. 2-3, pp. 283-304, February 2007) and X. Jiang et al. ("InGaAsP—InP avalanche photodiodes for single photon detection," *IEEE Journal of Selected Topics in Quantum Electronics*, vol. 13, no. 4, pp. 895-905, August 2007). Second, the entire curve seems to be shifted toward higher µ; this result indicates a slight decrease in efficiency. These two effects become more pronounced with higher trigger rates. These deviations due to the afterpulsing effect are accounted for by modifying the expression for the count probability (see below).

The afterpulsing effect is characterized by the conditional probability Q(t) of having an avalanche for the detector gate being open after a time interval t since a successful detection event. It is assumed that this conditional probability decays exponentially with a time constant $\tau$: $Q(t)=Q_0 \exp(-t/\tau)$, where $Q_0$ is referred to as the afterpulsing constant, and $\tau$ is referred to as the detrap time. Then $Q_n$ is the conditional probability of the avalanche occurrence after exactly n clock cycles in the detector that is gated with the trigger rate R:

$$Q_n = Q_0 \exp(-n/R\tau).  \quad (E2)$$

Within this model, the overall probability of a registered event (count probability) $P_c$ is found to be determined by the relationship:

$$P_c = P1\{\bullet\} + \frac{1}{2}\sqrt{P2\{\bullet\} + P3\{\bullet\}}, \quad (E3)$$

where $$P1\{\bullet\} = \frac{2 - e^{1/R\tau} - (1 - P_{dc})(1 - P_{ph})(1 - Q_0)}{2},$$

$$P2\{\bullet\} = [2 - e^{1/R\tau} - (1 - P_{dc})(1 - P_{ph})(1 - Q_0)]^2, \text{ and}$$

$$P3\{\bullet\} = 4(e^{1/R\tau} - 1)[1 - (1 - P_{dc})(1 - P_{ph})].$$

Here, $P_{ph}$ is the probability of detecting photons generated by the specific source in the absence of both dark counts and afterpulses. For a Poissonian source of single photons, such as attenuated coherent laser light corresponding to optical beam 237, $$P_{ph} = 1 - \exp(-\mu\eta). \quad (E4)$$

For $Q_0 \to 0$ or $\tau \to 0$, (E3) reduces to the more simple form (E1).

The derivation of (E3) is accomplished in two steps. The first step consists of evaluating the marginal probability of an afterpulse $P_{ap}$:

$$P_{ap}^{(n)} = P_c^{(n-1)}Q_1 + (1-P_c^{(n-1)})P_c^{(n-2)}Q_2 + (1-P_c^{(n-1)})(1-P_c^{(n-2)})P_c^{(n-3)}Q_3 + \ldots, \quad (E5)$$

where the superscript n denotes that the corresponding probability is evaluated at the n-th time interval. Note that $Q_k$ is a conditional probability of an afterpulse given that no counts occurs during the time t=k/R.

Substitution of (E2) into (E5) yields:

$$P_{ap}^{(n)} = P_c^{(n-1)}Q_1 + P_{ap}^{(n-1)}(1-P_c^{(n-1)})Q_1/Q_0. \quad (E6)$$

After a sufficiently long measurement time (sufficiently large number of trigger cycles), the probabilities $P_{ap}^{(n)}$ $P_c^{(n)}$ and reach their stationary values and can be replaced by $P_{ap}$ and $P_c$, respectively, in (E6), which is then solved for $P_{ap}$:

$$P_{ap} = \frac{P_c Q_1}{1 - (1 - P_c)Q_1/Q_0}. \quad (E7)$$

The second step of the derivation consists of extracting $P_c$ from $P_c = 1-(1-P_{dc})(1-P_{ph})(1-P_{ap})$, where $P_{ap}$ is given by (E7). For $Q_0 \to 0$ or $\tau \to 0$ (that is, $Q_1 \to 0$), (E7) yields $P_{ap}=0$.

Therefore, $P_c$, as evaluated from $P_c=1-(1-P_{dc})(1-P_{ph})$, reduces to the simple form given in (E1).

Figure 5:
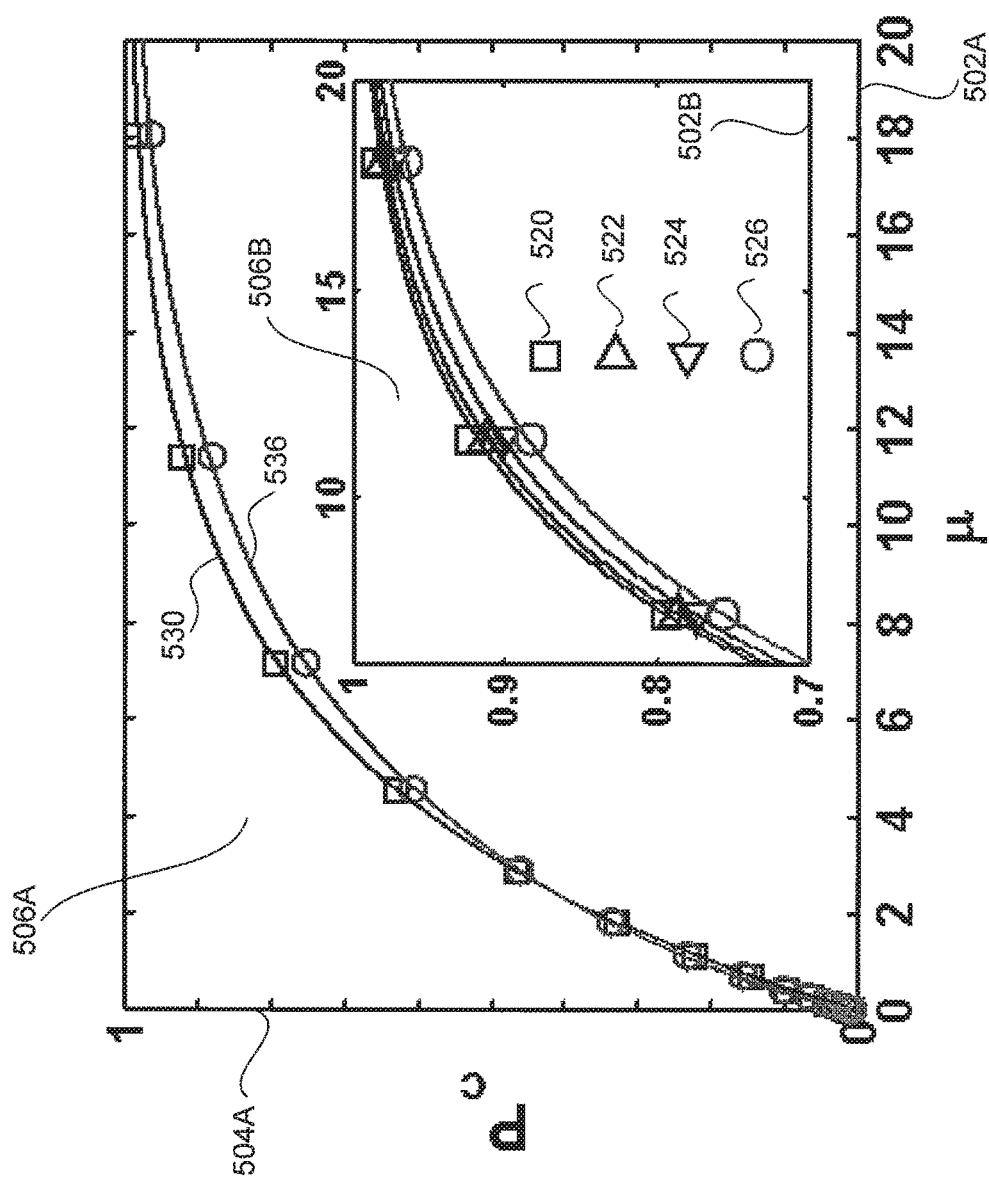
FIG. 5 shows plots of probability count for a continuous wave laser source and a pulsed laser source as a function of the average number of photons per detector gate at a fixed trigger rate.

FIG. 5 shows plots of the measured count probability for a CW laser as a function of average number of photons per detector gate at different trigger rates, over a range of approximately 100 kHz to 1 MHz. A different range can be used, depending on the detector. To show sufficient detail, two sets of plots are shown: set 506A in the principal field, and set 506B in the inset. The horizontal axes, horizontal axis 502A and horizontal axis 502B, represent the average number of photons per detector gate, $$\mu_{cw} = \frac{10^{(P_{cw}/10)}}{1000 \times h \times v} \times \tau_g,$$

over the range from 0.1 to 20. The data is taken at four different trigger rates (R): data points 520, data points 522, data points 524, and data points 526 correspond to measured values for R=100 kHz, 250 kHz, 500 kHz, and 1 MHz, respectively. As discussed below, the plotted lines correspond to fitted curves.

As discussed above, for each trigger rate R, the dependence of $P_c$ on $\mu_{cw}$ can be described by (E3), computed with the corresponding values of R. The following operational parameters of the detector can then be extracted by fitting (E3) to the experimental data: the efficiency for each trigger rate $\eta(R)$, the afterpulsing constant $Q_0$, and the detrap time $\tau$.

The rate dependent dark count probability $P_{dc}$ is first measured. Then a simultaneous fit is performed for all four experimentally obtained dependencies of the count probability on the average photon number per detector gate. By inserting the resulting parameters back into (E3), fitted plots can be made. Two full-range representative fitted plots (corresponding to the low end and the high end of the range of trigger rates) are shown in set 506A of FIG. 5: fitted plot 530 corresponding to R=100 kHz and fitted plot 536 corresponding to R=1 MHz. The high quality of the fits can be clearly seen. By using only a limited range of $\mu_{cw}$=3-20 (corresponding to an easily measurable interval of -61 dBm≤$P_{cw}$≤-53 dBm) a nearly perfect match is obtained for the data within a rms deviation of 3×10⁻⁴. Therefore, the operational parameters of the detector can be extracted from measured photon counts at a relatively high number of incident photons.

FIG. 6A shows plots of the extracted detector efficiency as a function of trigger rate. The horizontal axis 602 represents the trigger rate R (kHz). The vertical axis 604 represents the extracted detector efficiency $\eta$(%). Points 610 (open squares) show the values for a CW laser source at relatively high powers; points 612 (filled dots) show the values for a pulsed laser source at relatively high powers. For low trigger rates R=100 kHz and R=250 kHz, the CW laser source and the pulsed laser source yield nearly identical results. At R=250 kHz, the measured efficiency is 21%, which is in close agreement with the manufacturer's specification of 20%. The data indicates that the efficiency drops with trigger rate. The drop is more pronounced for a CW laser source, resulting in a 2% deviation from the value of 19.7% measured with a pulsed laser source at R=1 MHz.

The observed trends in the efficiency are also reflected in the afterpulsing probabilities, as shown in the plots in FIG. 6B. The horizontal axis 632 represents time (µs). The vertical axis 634 represents $Q(t)=Q_0 \exp(-t/\tau)$, with the afterpulsing constant $Q_0$ and the detrap time $\tau$ extracted from the fits. Plot 640 shows the results for a CW laser source; plot 642 shows the results for a pulsed laser source. The CW laser source and the pulsed laser source yield similar results for times greater than 4-5 µs, that is, corresponding to trigger rates less than 200-250 kHz. For small time values, the afterpulsing effect for a CW laser source grows significantly. The CW detrap time $\tau_{cw} \approx 2.5\text{-}3.0$ µs appears to be slightly smaller than the values obtained for the pulsed laser source, $\tau_{pulsed} \approx 4.0\text{-}5.0$ µs, which are more consistent with the values reported by the device manufacturers. One possible reason for this discrepancy is that the relaxation in the CW regime might be a combination of several processes beyond afterpulsing; the other processes, for example, might be the charge persistence or twilight effect as being dominant for small time values for a CW laser source (see J. Zhang et al., "Comprehensive characterization of InGaAs/InP avalanche photodiodes at 1550 nm with an active quenching ASIC," *IEEE J. Quantum Electron.*, vol. 45, Issue 7, pp. 792-799, July 2009, and S. V. Polyakov and A. L. Migdall, "High accuracy verification of a correlated photon-based method for determining Photon counting detection efficiency", *Optics Express*, vol. 15, No. 4, pp. 1390-1407, February 2007).

Figure 2B:
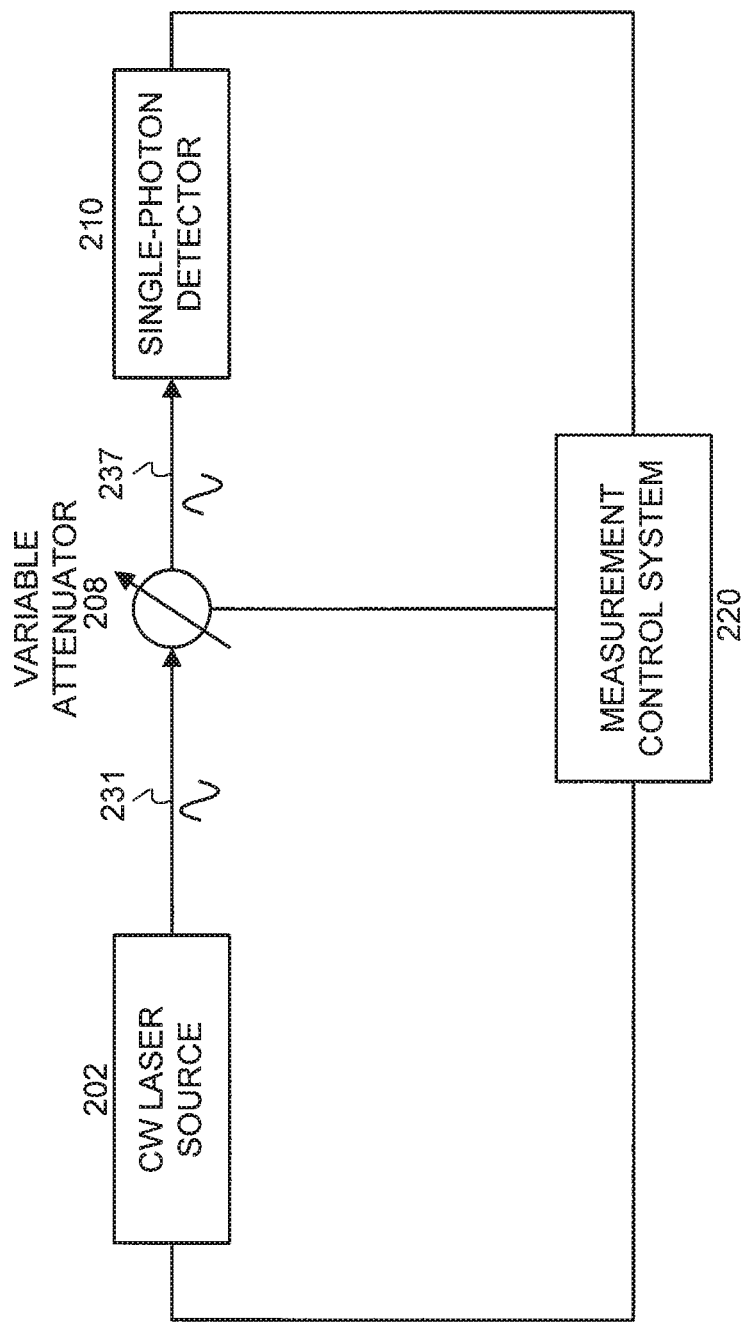
FIG. 2B shows a schematic of a field measurement system for measuring the operational parameters of a single-photon detector.

An embodiment of a measurement system for characterizing the operational parameters of a single-photon detector is shown in FIG. 2B. It is similar to the measurement system in FIG. 2A, except the components used in FIG. 2A for initial calibration of the variable attenuator, comparison with a reference pulsed laser source, and determination of the effective gate window, are no longer present. Note that the effective gate window is a parameter that can also be reported by the detector manufacturer. In one embodiment, the SPD under test is decoupled from its normal operating network connection (see FIG. 1) and coupled to the measurement system. As described above with reference to FIG. 2A, continuous wave laser source 202 transmits optical beam 231 through variable attenuator 208. The output of variable attenuator 208, optical beam 237, is transmitted to single-photon detector 210. The electronic charge pulses from the output of single-photon detector 210 are detected and counted by counter 214. Measurement control system 220 controls the operation of CW laser source 202, variable attenuator 208, single-photon detector 210, and counter 214.

Figure 7:
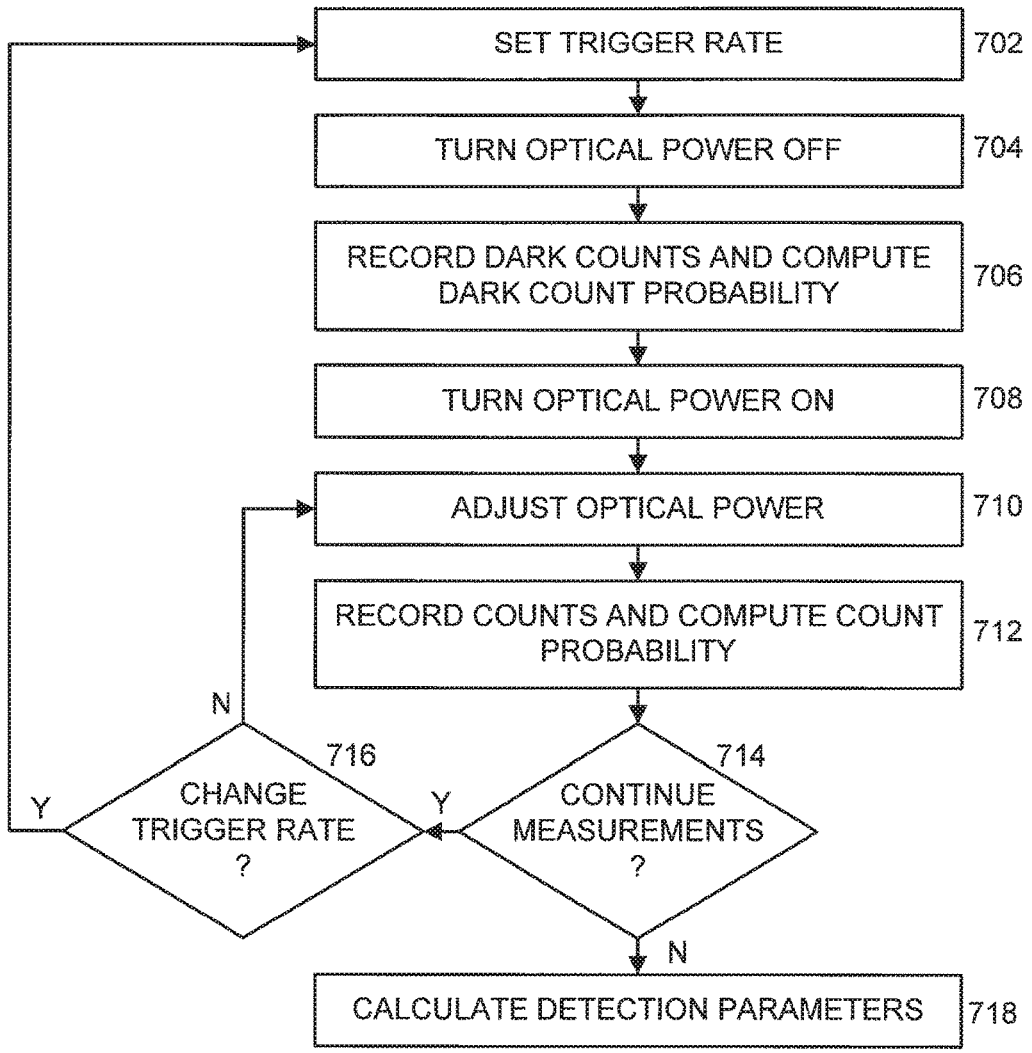
FIG. 7 shows a flowchart of a method for measuring the operational parameters of a single-photon detector.

FIG. 7 shows a flowchart of steps for a method for measuring the operational parameters of single-photon detector 210. The SPD measurement system is configured as shown in FIG. 2B. For a specific value of R, counts are measured under dark conditions and under multiple values of input CW laser power. The measurements are then repeated for multiple values of R. After all the measurements have been completed, the operational parameters are computed. Since the operational parameters are a function of temperature, the temperature of single-photon detector 210 is stabilized at a user-specified temperature prior to the set of measurements. Measurements can be taken over a user-specified set of temperatures, if desired.

In step 702, the trigger rate R is set at a first value for single-photon detector 210. The process then passes to step 704, in which the optical power from CW laser source 202 is turned OFF. The process then passes to step 706, in which dark counts $D_{dark}$ over a specified measurement time are recorded by counter 214. The dark count probability is then computed from $P_{dc} = D_{dark}/R$. The process then passes to step 708, in which the optical power from CW laser source 202 is turned ON. The process then passes to step 710, in which variable attenuator 208 is adjusted to set the input optical power to single-photon detector 210 to a first value. The process then passes to step 712, in which the counts D are recorded over a specified measurement time. The count probability is then computed from $P_c = D/R$.

The process then passes to decision step 714. If more measurements at the same trigger rate are to be taken, then the process returns to step 710, in which variable attenuator 208 is adjusted to set the input optical power to single-photon detector 210 to a different value. For a fixed value of trigger rate, step 710—step 714 are iterated for a user-specified number of cycles. The process then passes to decision step 716. If measurements are to be taken at a different trigger rate, then the process returns to step 702, in which the trigger rate is set to a different value. Step 702—step 716 are iterated for a user-specified number of cycles. When the set of measurements has been completed, then the process passes from step 716 to step 718.

In step 718, the following operational parameters of the detector are computed by fitting the measured data to (E3): the efficiency as a function of trigger rate $\eta(R)$, the afterpulsing constant $Q_0$, and the detrap time $\tau$.

Figure 8:
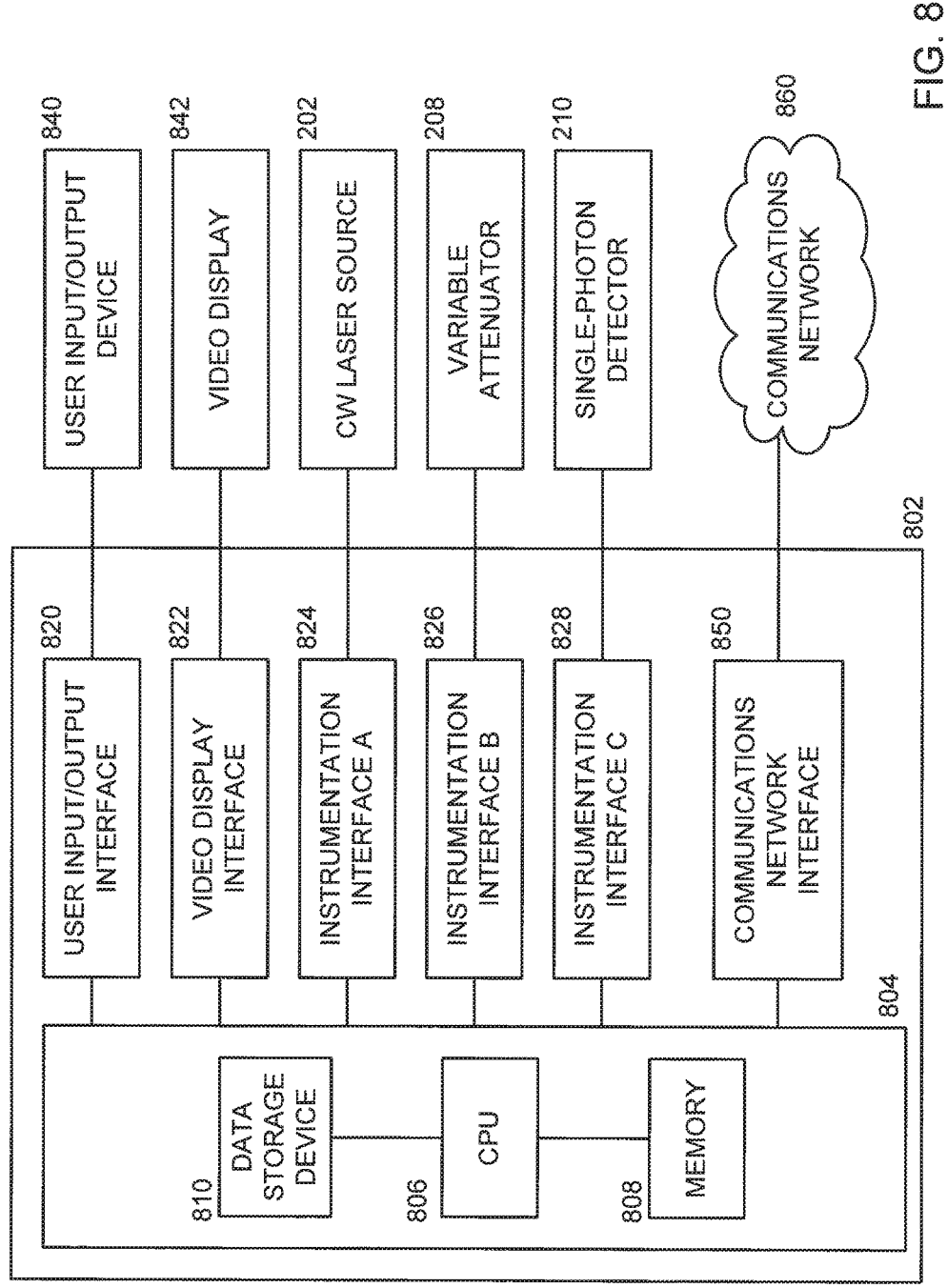
FIG. 8 shows a schematic of a computational system for implementing a measurement control system.

FIG. 8 shows a schematic of an embodiment of a computational system for implementing a measurement control system 220 (see FIG. 2B). One skilled in the art can construct the computational system 802 from various combinations of hardware, firmware, and software. One skilled in the art can construct the computational system 802 from various combinations of electronic components, such as general purpose microprocessors, digital signal processors (DSPs), application-specific integrated circuits (ASICs), and field-programmable gate arrays (FPGAs).

Computational system 802 comprises computer 804, which includes a central processing unit (CPU) 806, memory 808, and data storage device 810. Data storage device 810 comprises at least one non-transitory, persistent, tangible computer readable medium, such as non-volatile semiconductor memory, a magnetic hard drive, and a compact disc read only memory.

Computational system 802 can further comprise one or more user input/output interfaces that interface computer 804 with user input/output devices. For example, user input/output interface 820 interfaces computer 804 with user input/output device 840. Examples of user input/output device 840 include a keyboard, a mouse, and a local access terminal. Data, including computer executable code, can be transferred to and from computer 804 via user input/output interface 820.

Computational system 802 can further comprise video display interface 822, which drives video display 842 and can receive user input from video display 842.

Computational system 802 can further comprise one or more instrumentation interfaces. For example, instrumentation interface A 824 interfaces computer 804 with CW laser source 202; instrumentation interface B 826 interfaces computer 804 with variable attenuator 208; instrumentation interface C 828 interfaces computer 804 with single-photon detector 210; and instrumentation interface D 830 interfaces computer 804 with counter 214 (see FIG. 2B).

Computational system 802 can further comprise one or more communications network interfaces that interface computer 804 with communications networks, such as local area networks and wide area networks. Data, including computer executable code, can be transferred to and from computer 804 via communications network interfaces. For example, communications network interface 832 interfaces computer 804 with communications network 852. Computational system 802 can be remotely accessed and controlled via communications network 852.

As is well known, a computer operates under control of computer software, which defines the overall operation of the computer and applications. CPU 806 controls the overall operation of the computer and applications by executing computer program instructions that define the overall operation and applications. The computer program instructions can be stored in data storage device 810 and loaded into memory 808 when execution of the program instructions is desired. The method steps shown in the flowchart in FIG. 7 can be defined by computer program instructions stored in memory 808 or in data storage device 810 (or in a combination of memory 808 and data storage device 810) and controlled by the CPU 806 executing the computer program instructions. For example, the computer program instructions can be implemented as computer executable code programmed by one skilled in the art to perform algorithms implementing the method steps shown in the flowchart in FIG. 7. Accordingly, by executing the computer program instructions, the CPU 806 executes algorithms implementing the method steps shown in the flowchart in FIG. 7.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. An apparatus comprising:
   a processor; and
   a memory to store computer program instructions, the computer program instructions when executed on the processor cause the processor to perform operations comprising:
   recording dark counts at a trigger rate with a single-photon detector;
   computing a dark count probability for the trigger rate based on the dark counts;
   recording counts at the trigger rate with the single-photon detector, the counts generated by a continuous wave laser at an optical power;
   computing a count probability based on the counts; and
   calculating an operating parameter of the single-photon detector by fitting the dark count probability and the count probability to a user-defined relationship defining a probability of detecting photons generated by a specific source in an absence of the dark counts and afterpulses,
   wherein the calculating the operating parameter comprises calculating one of:
   an efficiency η;
   an afterpulsing constant $Q_0$; and
   a detrap time τ; and
   wherein the probability of detecting the photons generated by the specific source in the absence of the dark counts is exponentially related to an average number of the photons per detector gate,
   wherein the user-defined relationship comprises:

$$P_c = P1\{\bullet\} + \frac{1}{2}\sqrt{P2\{\bullet\} + P3\{\bullet\}}, \text{ wherein:}$$

$$P1\{\bullet\} = \frac{2 - e^{1/R\tau} - (1 - P_{dc})(1 - P_{ph})(1 - Q_0)}{2},$$

$$P2\{\bullet\} = [2 - e^{1/R\tau} - (1 - P_{dc})(1 - P_{ph})(1 - Q_0)]^2,$$

$$P3\{\bullet\} = 4(e^{1/R\tau} - 1)[1 - (1 - P_{dc})(1 - P_{ph})],$$

$$P_{ph} = 1 - \exp(-\mu\eta),$$

$P_c$ is the count probability,
$P_{dc}$ is the dark count probability,
μ is the average number of the photons per detector gate, and
R is the trigger rate.

2. The apparatus of claim 1, the operations further comprising:
   generating the optical power by attenuating a constant optical power generated by the continuous wave laser.

3. The apparatus of claim 1, wherein a wavelength of the continuous wave laser ranges from approximately 1.3 microns to approximately 1.6 microns.

4. The apparatus of claim 1, wherein the count probability is derived from evaluating a probability of an afterpulse occurring at a predetermined time interval after a photon count.

5. The apparatus of claim 1, wherein the trigger rate is fixed.

6. The apparatus of claim 1, wherein the trigger rate is variable.

7. The apparatus of claim 1, wherein the continuous wave laser is turned off prior to the recording dark counts.

8. The apparatus of claim 2, wherein the optical power is attenuated using a wide-range variable attenuator.

9. The apparatus of claim 7, wherein the continuous wave laser is turned on after the recording dark counts.

* * * * *